April 16, 1940.    T. E. MARTIN    2,197,503
AIR INTAKE FOR AIR CLEANERS
Filed April 30, 1938
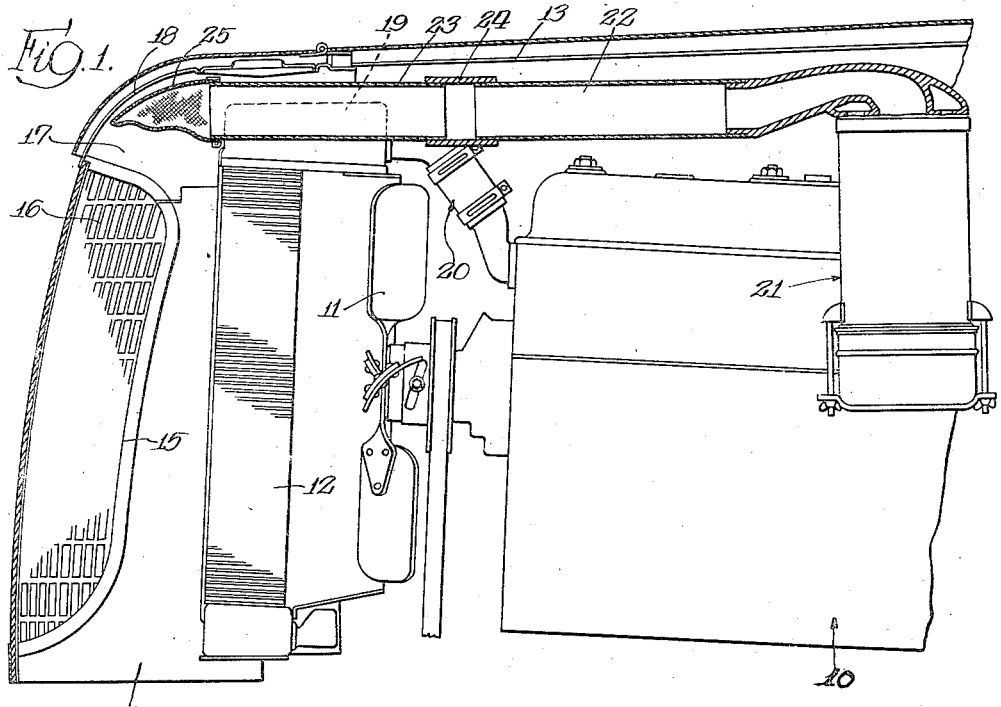
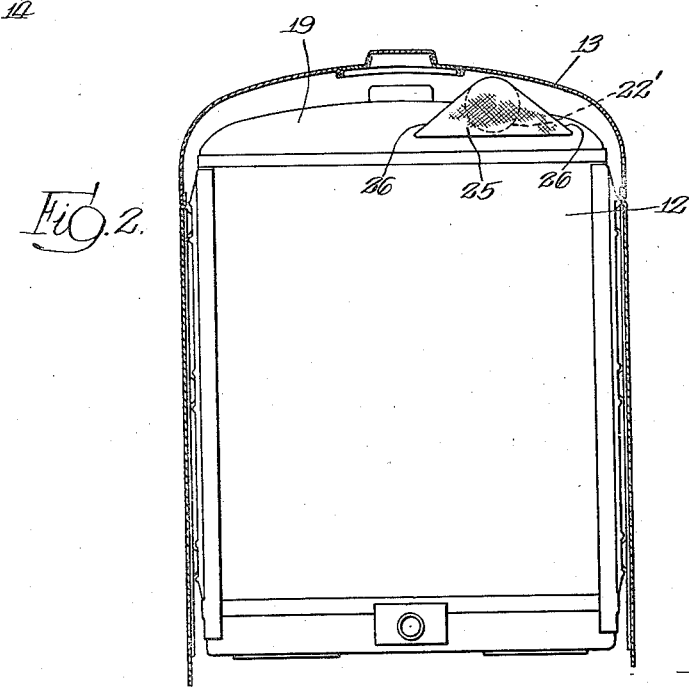
Inventor:
Thomas E. Martin.
By John P. Smith atty.

Patented Apr. 16, 1940

2,197,503

UNITED STATES PATENT OFFICE 2,197,503

AIR INTAKE FOR AIR CLEANERS

Thomas E. Martin, Charles City, Iowa, assignor to Oliver Farm Equipment Company, a corporation of Delaware Application April 30, 1938, Serial No. 205,199

2 Claims. (Cl. 123—119)

The present invention relates generally to motor vehicles of the internal combustion type, but more particularly to a novel arrangement or positioning of the air intake of the air cleaner for the internal combustion engine of a motor vehicle.

The primary object of the present invention is to provide a novel construction and a novel positioning of the air intake for an internal combustion engine of a motor vehicle so that full advantage of the conventional motor fan is taken in preventing dirt and other dust particles from entering the air inlet.

A further object of the invention is to provide a novel and improved construction and arrangement of an air intake for an internal combustion engine of a motor vehicle in which the air inlet is positioned over the radiator core of the water circulating system and is shielded by the grille hood of the motor vehicle.

These and other objects are accomplished by providing a construction and an arrangement of the various parts in the manner hereinafter described and particularly pointed out in the appended claims.

Referring to the drawing:

Fig. 1 is a fragmentary side elevational view partly in cross section illustrating the engine construction of a more or less conventional motor vehicle having my improved air intake embodied therein; and Fig. 2 is a front elevational view of the construction illustrated in Fig. 1 with the grille and grille hood removed therefrom for the purpose of clearness.

In illustrating one form of my improved construction and arrangement of air intake I have shown the same in connection with a conventional form of motor vehicle which includes an internal combustion engine generally indicated by the reference character 10 which has mounted at its forward end and operatively driven by the engine, a motor fan, in the manner well understood in the art. Positioned in advance of the fan 11 and secured to the frame structure in any well known manner is a conventional radiator core 12 through which the water circulates in the function of cooling the engine. The engine 10, fan 11 and radiator core 12 are encased by the usual hood generally indicated by the reference character 13. Extending forwardly from the radiator core are curved side members or shields 14 which have relatively large vertical openings 15 in which a perforated grille 16 is mounted. The air passes through this grille in its travel rearwardly and through the radiator core in its function of cooling the water of the cooling system of the internal combustion engine. Encasing the upper portion or compartment 17 between the grille and the forward surface of the radiator core 12 is a grille hood 18. Secured to and communicating with the radiator core 12 at the upper end thereof is the usual water tank or compartment 19. This compartment 19 communicates by means of a conduit generally indicated by the reference character 20 to the motor block of the engine 10 in the manner well understood in the art. Mounted on one side of the motor or engine 10 is a conventional air cleaning device 21 which may be any type or construction. Communicating with and extending forwardly from the air cleaner 21 is an air intake pipe or conduit 22. The motor vehicle and engine parts thus far described per se form no part of the present invention except in combination with the construction and arrangement of my improved air intake as will hereinafter be more fully described.

The essential feature of the present invention not only involves the positioning of the air intake at a point at the forward end of the tractor or motor vehicle where it is located at a point furthest removed from the rear traction or driving wheels where the greatest amount of dust and dirt is developed, but also involves the positioning of this air intake in relatively close proximity to the motor fan so that it is above the normal path of travel of dust laden air drawn in by the fan through the grille and radiator core. This arrangement makes use of the conventional motor fan and reduces to a minimum the dust entering the air intake. This novel arrangement includes a semi-circular depressed recess 22' formed on one side of the longitudinal center of the water tank or compartment 19 in which is secured an air pipe or conduit 23. This pipe or conduit 23 is connected by a connection 24 to the forward end of the air intake conduit 22. The forward end of the conduit 23 projects a slight distance forwardly of the forward surface of the radiator core 12 and has its forward opening or air inlet covered by a fine wire mesh member 25. This wire mesh member 25 has widely diverging and outwardly projecting sides 26 so as to present sufficient area for the entrance of air thereinto in its function of separating chaff and other light particles from the air. In this connection it will be observed that the air inlet protrudes into the compartment 17 which is shielded by the grille shield 18 and completely closed from the engine compartment rearwardly of the radiator core so that the air entering the compartment 17 and air inlet is drawn wholly from the outside through the radiator grille, thereby supplying relatively cool air and at the same time utilizing the motor fan as one of the elements for cleaning and drawing in the dust laden air and preventing the same from passing into the air inlet.

From the above description it will be readily seen that by positioning the air intake at the most removed point from the rear driving wheels, shielding the same and utilizing one of the conventional elements of the engine structure to reduce to a minimum the dust particles entering the intake, I have not only increased the efficiency of the air cleaner, but have also reduced to a minimum the parts necessary to secure this improved result.

While in the above specification I have described one embodiment which my invention may assume in practice, it will of course be understood that the same is capable of modification and that modification may be made without departing from the spirit and scope of the invention as expressed in the following claims:

What I claim as my invention and desire to secure by Letters Patent is:

1. The combination with an internal combustion engine having a fan associated therewith, a radiator forward of said fan, an air cleaner for supplying clean air to said engine, and an air intake located above said radiator communicating with said cleaner and having one end extending forwardly of said fan and radiator out of the path of the air sucked through the radiator by the fan whereby particles of dirt are prevented from entering said intake.

2. The combination with an internal combustion engine having a fan and a radiator associated therewith, an air cleaner for supplying clean air to said engine, a grille spaced forwardly of said radiator, a hood extending over and forwardly of said radiator, an air conduit above said radiator and communicating with said cleaner, and a screen positioned over the inlet end of said conduit and located between said grille and said radiator.

THOMAS E. MARTIN.